June 6, 1972   F. W. BRUNNER   3,667,971
METHOD OF FORMING AND WRAPPING FOODSTUFFS
Filed July 13, 1970   7 Sheets-Sheet 1
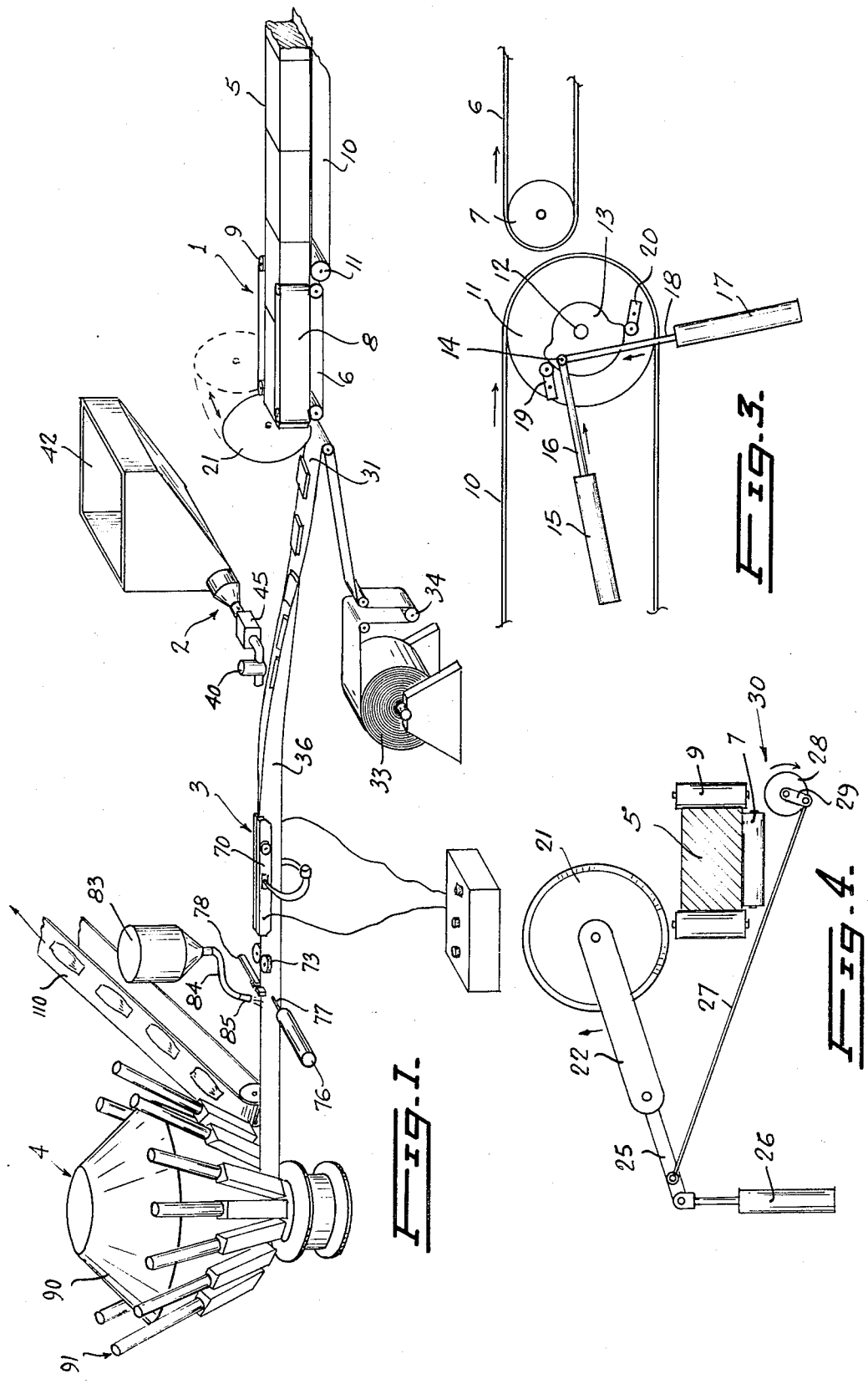

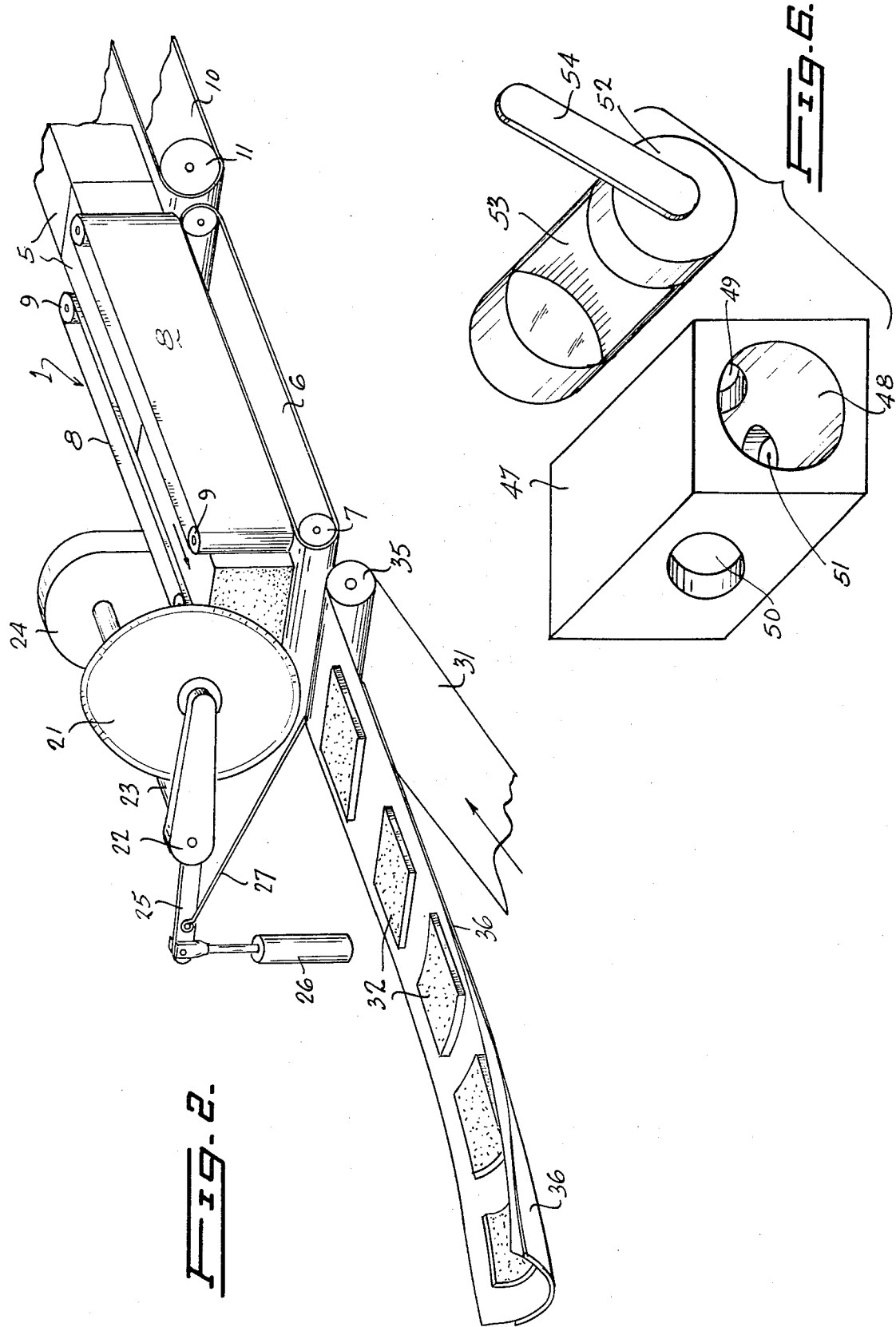

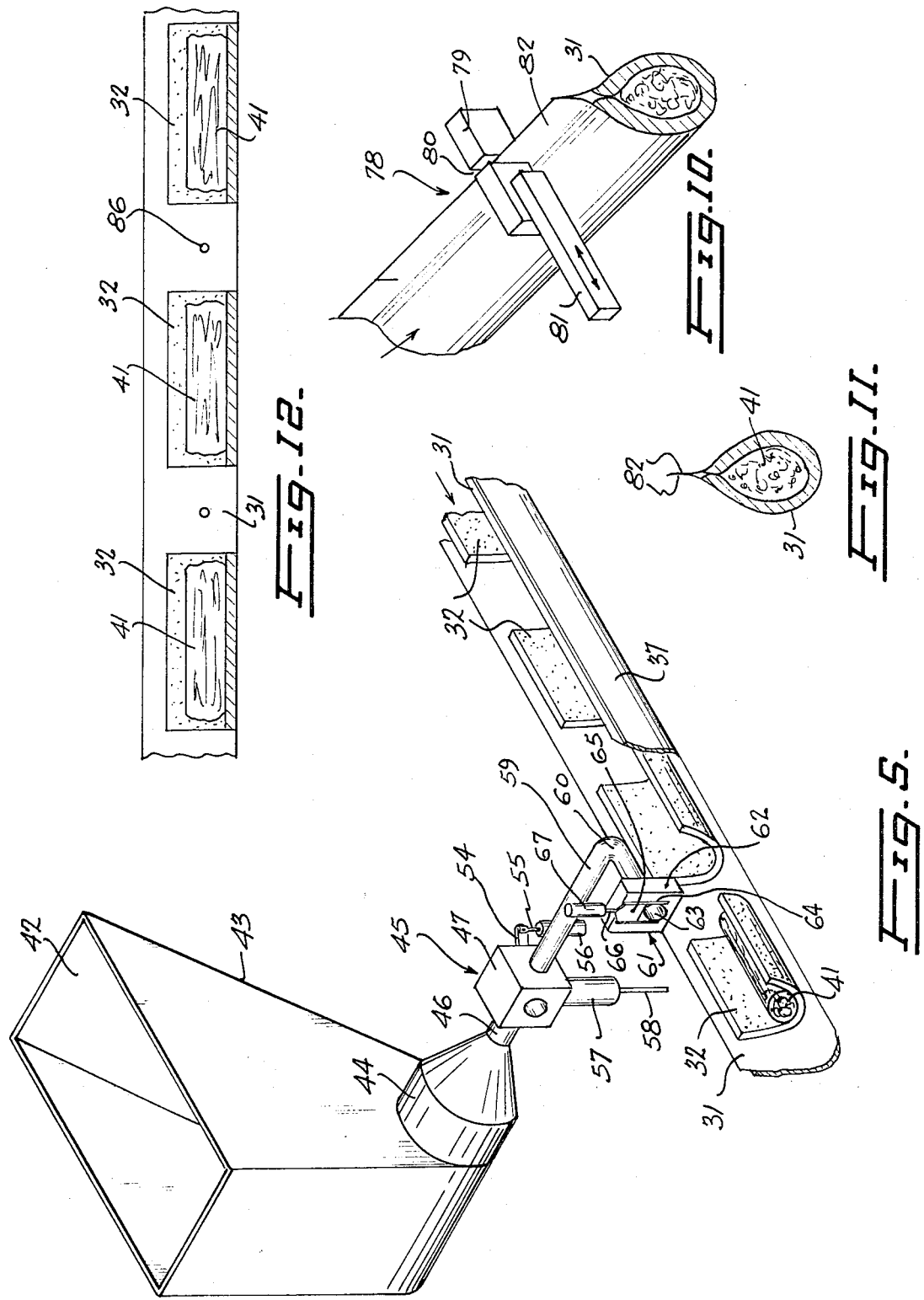

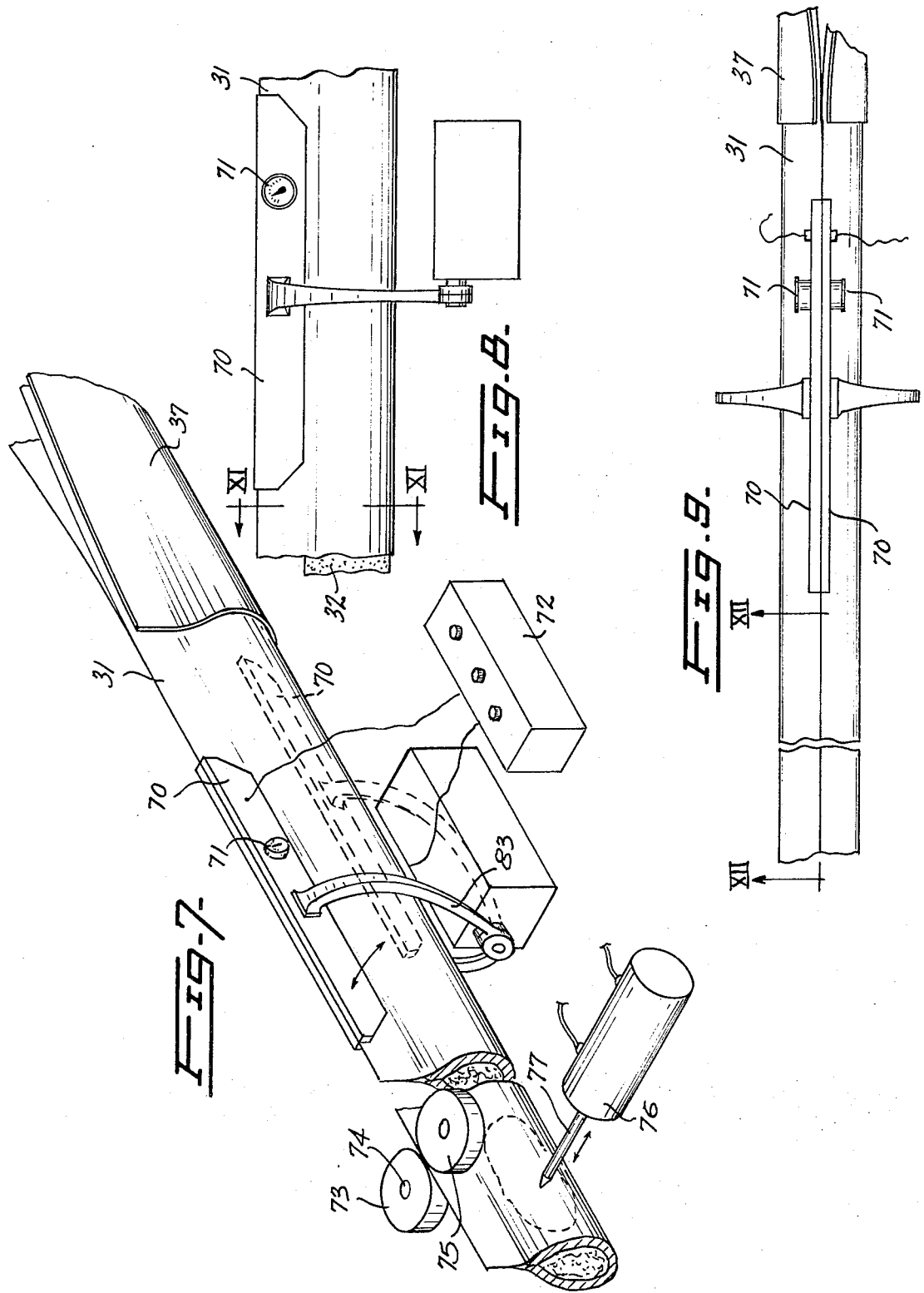

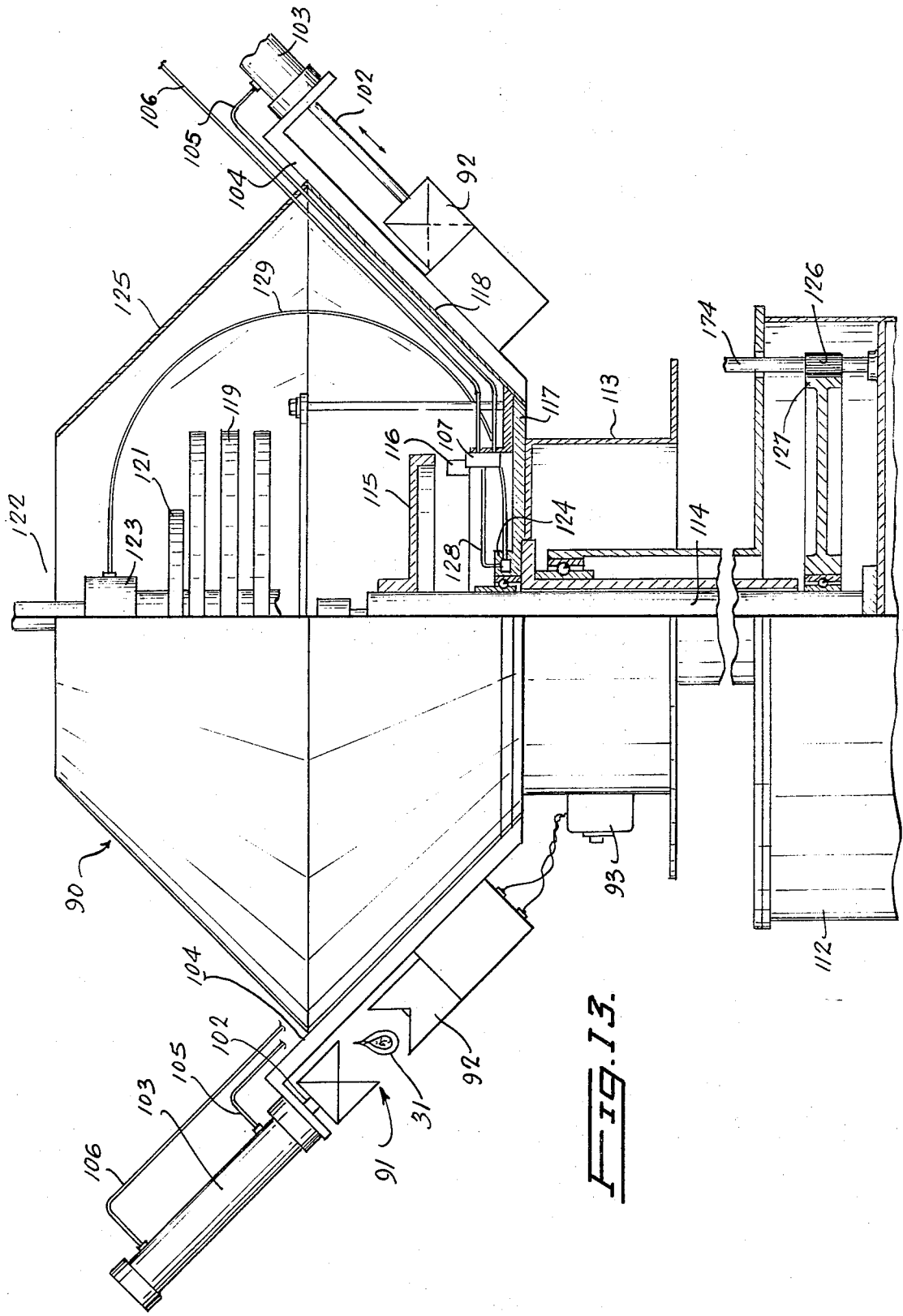

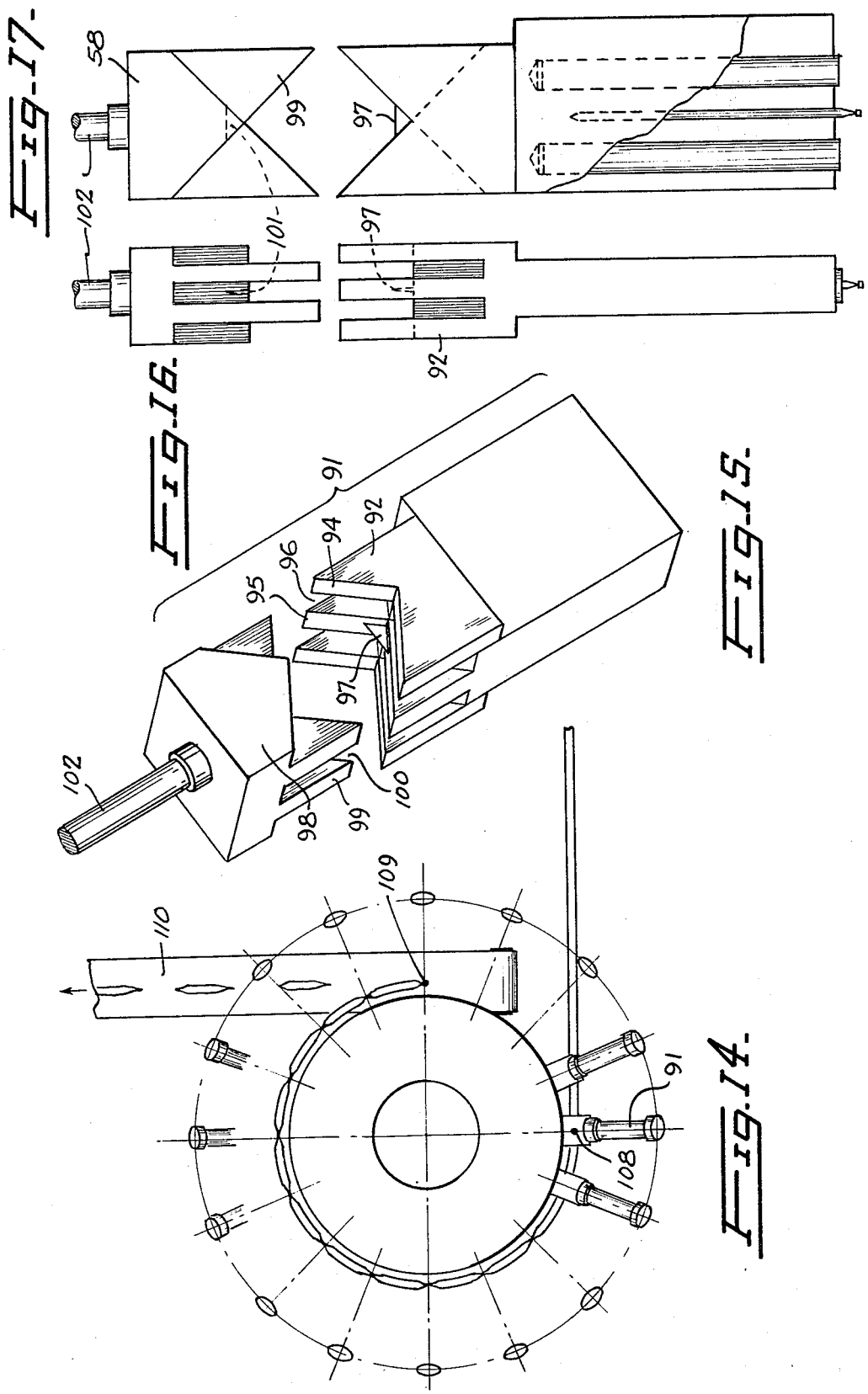

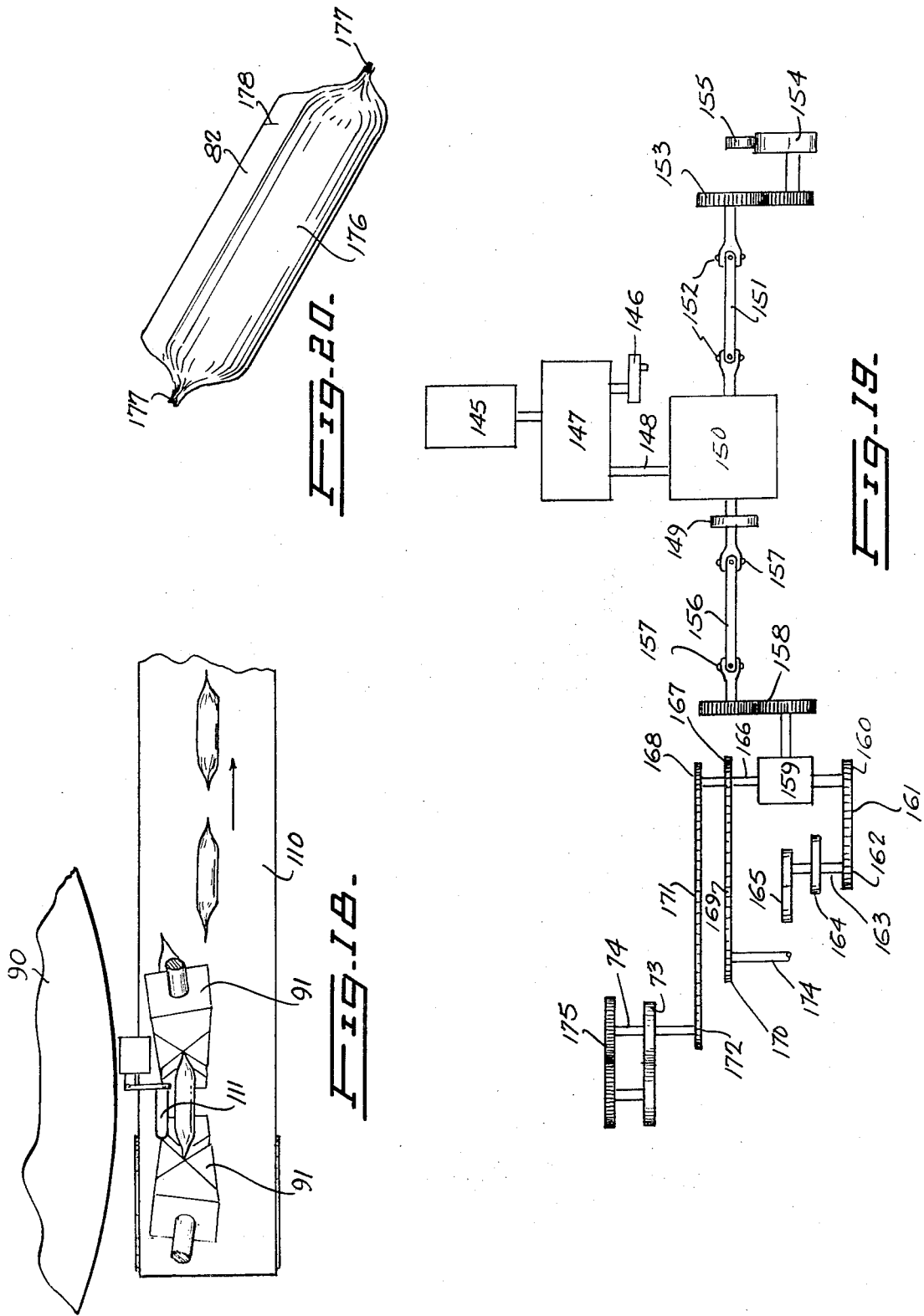

3,667,971
METHOD OF FORMING AND WRAPPING FOODSTUFFS
Fred William Brunner, Eugene, Oreg., assignor to
Manning's Inc., San Francisco, Calif.
Filed July 13, 1970, Ser. No. 54,115
Int. Cl. B65b *25/06*
U.S. Cl. 99—171 R    6 Claims

ABSTRACT OF THE DISCLOSURE

A method for forming and wrapping foodstuffs such as tamales whereby a foodstuff is deposited on a wrapping material, the foodstuff and wrapping material being formed into a U-shape and then heat sealed across the upwardly extending edges after depositing filling material into the foodstuff. The wrapping material is then heat sealed between adjoining foodstuffs.

BACKGROUND OF THE INVENTION

(1) Field of the invention

The present invention relates to improvements in automatic machines for converting foodstuffs in mass form into condition for packaging. More particularly, the present invention relates to a fully automatic machine for shaping, wrapping, cutting and delivering foodstuffs to provide a product, such as tamales, ready for packaging and consumption.

(2) Description of the prior art

As is well known, tamales are made from ingredients of a highly varied nature but generally include cornmeal, meats formed from beef, beef fat, pork, etc., wheat flour, spices, flavoring and many other substances as desired. The tamale is usually sold as a finished product with the cornmeal circumscribing the meat ingredients and enclosed in a paper wrapper to preserve its freshness.

Tamales have traditionally been made by hand and wrapped in either paper or corn husks. It is readily evident that the making of tamales by hand is very expensive in terms of labour so that there is clearly a need for a satisfactory tamale-making machine. Since there is a certain amount of tradition surrounding the art of tamale-making, it must be appreciated that any satisfactory machine for producing tamales must not only be able to produce the tamale itself with the cornmeal circumscribing the meat ingredients, but it should also be able to provide the somewhat rough crumpled finish of the paper wrapper, especially the bunched or crimped ends, that is characteristic of a hand-made and wrapped tamale.

Attempts have been made for many years to produce a satisfactory automatic tamale-forming and wrapping machine and an early such attempt is described in Gage et al., U.S. Pat. 2,303,351, issued Dec. 1, 1942. The Gage machine was designed to operate continuously with the cornmeal and meat paste being discharged from separate nozzles and deposited on a moving strip of wrapping paper. This wrapping paper carrying the cornmeal and meat paste then passed through a continuously curving folder guide to wrap the paper around the mass of meat paste and cornmeal thus forming a tube of wrapped tamale material. This tube was then flattened at spaced positions therealong while travelling on a conveyor and was cut by means of rotary knives at these flattened positions.

This device had several disadvantages, the first being that with the arrangement of nozzles used, the meat paste and cornmeal ended up as a mingled mass of the two components and did not provide a core of meat paste circumscribed by the cornmeal as in a traditional tamale. Moreover, the manner of applying the wrapping paper did not provide good sealing of the paper, with the result that it was not effective in maintaining the freshness of the contained tamale food.

Another attempt to produce a tamale forming and wrapping machine is described in Walter, U.S. Pat. 2,343,599, issued Mar. 7, 1944. This device represented an improvement over the Gage device in that the nozzles for supplying the cornmeal and meat paste were concentrically arranged so that the meat paste was extruded while being completely circumscribed by the cornmeal. However, the Walter machine was designed merely to cut this wrapped tube into lengths without sealing the paper wrapper either along the length of the tamale or at the ends. Thus, the paper wrapper clearly did not provide good protection for the tamale and did not protect its freshness. It will also be noted that neither of the above machines in any way attempted to simulate the general appearance of a hand-made tamale with which the consumer is familiar.

The first attempt shown in the prior art to produce an automatic machine for making tamales wrapped in such a manner as to simulate hand-wrapped tamales is described in Maickel, U.S. Pat. 2,764,106, issued Sept. 25, 1956. With the Maickel machine, paper casings were formed as paper cylinders and these were crimped and closed at the lower end. These cylinders with the open tops were then stuffed with the tamale ingredients by moving them step-by-step through stations at which, in succession, a layer of cornmeal was applied to the container, and a measured quantity of gravy then introduced into the container. The top of each container was then crimped and sealed.

It will be readily evident that a paper cylinder of the above type is both difficult to produce, involving a relatively complex paper tube former and container former, and difficult to handle. Moreover, it is most difficult to try to stuff these cylinders with cornmeal and meat paste in such a way as to obtain a continuous and uniform cornmeal shell for the meat paste and thereby simulate the usual hand-made tamale.

It is, therefore, an object of the present invention to provide a novel automatic machine for handling foodstuffs, such as tamale material, and which shapes, wraps, cuts and discharges the foodstuffs in such a condition that it may be readily packaged in containers for storage or, if desired, further processing.

Another object of this invention is to provide a method for making tamales automatically in which cornmeal and a paste, say, a meat paste, are brought together, shaped and wrapped in an integrated sequence of steps embodying novel and advantageous features.

A further and more specific object of this invention is to provide a paper-wrapped automatically-formed tamale in which the crumpled appearance and crimped ends of a hand-wrapped tamale are attained in a novel fashion.

Additional objects and features of the invention will be apparent from the following description read in conjunction with the accompanying drawings.

SUMMARY OF THE INVENTION

According to this invention slices of a foodstuff, such as cornmeal, are deposited in spaced sequence on a continuously moving strip of wrapping material, say, for illustration, paper. This wrapping paper should be heat sealable, as, for example is paper coated on one or both surfaces with a thermoplastic polymer such as a polyethylene or a polyamide. Conveniently only the upper (inner) surface is coated. The heat-sealable wrapping paper is drawn through a forming channel which commences substantially flat and gradually curves upon along its length into a substantially U-shaped cross-section. Both the paper strip and the cornmeal slices carried thereon assume the shape of the shaping channel.

A nozzle for supplying metered amounts of a food paste, say, for the purposes of illustration, meat paste, is positioned above the channel and deposits a metered amount of the paste on each cornmeal slice as it passes beneath the nozzle.

As the paper strip travels along the forming channel, the upper edges thereof are drawn closely together. In this position, they pass between a pair of heated plates which heat seal the upper marginal edges of the coated wrapping paper together thus forming a continuous paper tube containing spaced cornmeal slices circumscribing a meat paste filler. Of course, any other type of heat-sealable sheet material can be used.

This continuous paper tube then passes to an end-sealing and cutting station which crimps, seals and cuts the paper tube between each cornmeal slice so that individual tamales are formed with crimped end seals which simulate hand-made tamales. The end-sealing and cutting station is a rotary device mounted on a vertical axis and has a series of radially mounted jaws adapted to press together, crimp and heat seal the paper tube between cornmeal slices. These jaws also include knives for cutting the paper in the sealed areas between cornmeal slices.

DESCRIPTION OF THE PREFERRED EMBODIMENTS

The cornmeal is preferably supplied to the automatic tamale-making machine as a long block of square cross-section and a radially mounted rotary cutter blade is provided for cutting slices from this block of cornmeal. As each slice is cut it falls down onto the continuous strip of wrapping paper with the cycle of the rotary cutter blade and the speed of the paper strip being controlled to deposit successive cornmeal slices on the paper strip at predetermined distances apart.

The meat paste is preferably stored in a hopper having a feed auger in the bottom thereof. The meat paste is forced by the auger out into a discharge pipe and metered amounts of the meat paste are discharged from the pipe onto the cornmeal slices by means of a pair of synchronized valves.

The heat sealing station includes a pair of electrically heated plates between which the top marginal edges of the wrapping paper travel. These plates press the two marginal edges together and heat them sufficiently to soften the thermoplastic material and provide a heat seal continuously along the top of the wrapping paper. As the continuous sealed tube which is formed emerges from the heat sealing station, a reciprocating knife can be provided for inserting a notch in the sealed flange to permit easy opening of the wrapper and an automatic lance can also be provided for puncturing a small hole in the paper wrapper in the space between the cornmeal slices as it passes by. The purpose of this small hole is to release any pressure build-up in the sealed container when the ends of each tamale wrapper are being crimped and heat sealed.

This continuous paper tube with the spaced apart tamales contained therein next proceeds to the end-sealing and cutting station for crimping and sealing the paper tube at the locations between the tamales and also cutting the tube at these locations to deliver tamales completely sealed in paper wrappers having the crimped appearance of a hand-made and wrapped tamale. This machine for forming the individual items from the tube represents a very important feature of the present invention. It is a rotary device mounted on a vertical axis and has a series of radially mounted crimping, sealing and cutting jaws. These radially mounted jaws are positioned a distance apart equal to the length of the final wrapped tamale and the entire rotary machine is positioned such that the continuous paper tube is delivered to it tangentially.

Each one of the radial jaws includes a fixed heated jaw and a movable jaw which can come into contact with the fixed heated jaw. The engaging faces of the two jaws present interlocking fingers which serve to crimp the paper held therebetween and in this crimped position the heated jaw serves to heat seal the paper in the crimped position. A knife is also positioned in the jaws so that when the jaws close, the paper tube is also severed at that position.

In operation, as each radial jaw unit in open position approaches the endless tube tangentially, the paper tube moves within the jaws and at this position the pair of jaws close firmly holding the paper tube. In this clamped position the tube travels in a circular path a substantial portion of the circular distance around the rotary machine and this gives sufficient time for the heated jaw to heat seal the crimped ends of the tamales. At this stage the upper jaw rises and an arm on the upper jaw lifts the tamale out of the lower jaws in which it is resting onto a final conveyor which conveys the completed tamale away from the machine.

The individual radial jaw units preferably have a lower fixed heated jaw and an upper movable jaw, this upper jaw being actuated by an air cylinder. The air cylinder can in turn be actuated by a pneumatic valve which is controlled by a rotating cam plate which rotates with the machine about the vertical axis.

It will be evident that this end-crimping, sealing and cutting device is readily adaptable not only to the production of tamales but any other packaged article which is first positioned in an endless paper tube which has to be cut and sealed at locations between the articles which are being carried in the tube.

DESCRIPTION OF THE DRAWINGS

The invention is illustrated by the attached drawings in which:

FIG. 1 is a general perspective view of the complete device for producing tamales;

FIG. 2 is a perspective view of the cornmeal cutting station;

FIG. 3 is a side elevation of the cornmeal block advancing conveyor;

FIG. 4 is an elevation of the ratchet device for advancing the cornmeal block;

FIG. 5 is a perspective view of the device for depositing meat paste;

FIG. 6 is an exploded perspective view of a meat paste control valve;

FIG. 7 is a perspective view of the top-sealing station;

FIG. 8 is a side elevation of the top-sealing station;

FIG. 9 is a top view of the top-sealing station;

FIG. 10 is a perspective view of a slit cutter for the top edge of a tamale wrapper;

FIG. 11 is a sectional view along line 11—11 of FIG. 8;

FIG. 12 is a sectional view along line 12—12 of FIG. 9;

FIG. 13 is a side elevation in partial section showing the end-crimping, sealing and cutting station;

FIG. 14 is a top plan view of the device shown in FIG. 13;

FIG. 15 is a perspective view showing details of a radial end-crimping, sealing and cutting unit;

FIG. 16 is an end elevation of the jaws of an end-crimping, sealing and cutting unit;

FIG. 17 is a side elevation of the jaws shown in FIG. 16;

FIG. 18 is a top plan view showing a completed tamale being ejected from the end-crimping, sealing and cutting station;

FIG. 19 is a schematic illustration of a drive and control mechanism for the device; and FIG. 20 is an illustration of a wrapped tamale according to the invention.

As will be seen from FIG. 1, the main components of the automatic tamale-making machine are a cornmeal cutting station 1, a meat paste delievery station 2, a top-sealing station 3, and an end-sealing and cutting station 4.

At the cornmeal cutting station 1, slices are cut from cornmeal blocks 5 by means of a rotary blade 21. The cornmeal blocks 5 are firmly held and moved forward by means of a bottom endless belt 6 mounted on driven rollers 7 and a pair of side endless belts 8 mounted on vertical driven rollers 9. It is the purpose of these endless belts to firmly hold a cornmeal block 5 in position for cutting and to intermittently move the block forward a distance equal to the width of a slice of cornmeal coincident with each upward swing of the rotary cutter blade 21. Adjacent the end of the endless belt 6 remote from the blade 21 is a supply conveyor belt 10 mounted on driven roller 11. This conveyor belt 10 can be of a substantial length and a series of blocks of cornmeal 5 can be placed thereon.

Since the cornmeal blocks 5 have a very soft consistency with little dimensional stability, it is evident that they are extremely difficult to handle and it has been found advantageous to continuously gently urge the blocks 5 forward on the supply conveyor 10 so that the blocks on the conveyor 10 are pushing against the end of the cornmeal block already travelling on the cutting station endless belt 6. This can be accomplished by the arrangement shown in FIG. 3 which includes a cam plate 13 mounted on drive shaft 12 of conveyor roller 11. The cam 13 includes a pivot 14 to which are connected rod 16 of air cylinder 15 and rod 18 of air cylinder 17. A pair of cam followers 19 and 20 are also provided and these actuate air valves (not shown) which control the operation of air cylinders 15 and 17 respectively. These air cylinders under a low air pressure continuously gently urge the conveyor belt 10 with the cornmeal blocks thereon forward in the direction of the arrow so that there is continuous, more or less uniform forward pressure on the cornmeal blocks on the cutting station conveyor 6.

Slices are cut from the cornmeal block 5 by means of the hollow-ground circular blade 21 mounted on radial arm 22. The blade 21 is driven by a motor (not shown) through a pulley within housing 24, drive shaft 23 and belt and pulleys within radial arm 22. The radial arm 22 also pivots about the drive shaft 23 so that the blade 21 swings up and down out of and into engagement with the cornmeal block 5. The radial arm 22 includes an extension 25 beyond the pivot and this is connected to an air cylinder 26 which controls the upward and downward swing of blade 21.

Also connected to the extension 25 is a rod 27 which is connected to a ratchet 30 consisting of a toothed wheel 28 and a pawl 29. The toothed wheel 28 is keyed to a drive shaft which in turn through a series of additional drive shafts and beveled gears provide a direct drive for cutting station endless belt rollers 7 and 9. The ratchet is arranged so that during the upward swing of the blade 21 immediately after it has cut a slice from the cornmeal block, the pawl 29 engages the toothed wheel 28, causing it to turn and this through the gearing arrangement to the rollers 7 and 9 actuates the endless belts 6 and 8 causing the cornmeal block 5 to advance forward a distance equal to the thickness of one slice. The blade 21 again swings down cutting off the next slice and so the cycle continuously repeats.

Immediately adjacent the rotary blade 21 is positioned a continuously moving strip of paper 31 onto which the freshly cut slices of cornmeal 32 fall. This paper 31 is coated, on the upper surface, with a thermoplastic material, e.g. polyethylene, and is dispensed from a roll 33. A suitable paper is that supplied by the Guardian Paper Company, San Francisco and may be described as a medium white parchment paper coated on one surface with polyethylene. It is important that a very uniform tension be maintained on the paper and for this purpose a spring loaded tensioner 34 is provided. It is also possible to provide the roll of paper itself with a direct positive drive to assist in the uniform feeding of the paper. The paper travelling from the roll 33 and through tensioner 34 passes over a guide roller 35 and then continues along an aluminum carrying and shaping channel 36. It will be seen from the rotary blade 21 is essentially flat and gradually assumes a substantially U-shaped cross-section with essentially vertical side walls 37. The paper 31 travelling within the carrier channel 36 adapts to the gradually changing profile of the channel itself.

Each slice 32, which is cut from a cornmeal block 5, falls sequentially onto the travelling paper 31 and is carried forward thereby along the carrier channel 36. The slices 32 conform to the shape of the paper and the carrier channel 36 so that they also gradually assume a substantial U-shaped cross-section. The cornmeal slices in this shape pass beneath a meat paste dispensing head 40 at which point they have deposited thereon metered amounts of meat paste 41.

MEAT PASTE DISPENSER

The meat paste dispensing device can be seen in greater detail in FIG. 5 from which it will be seen that it includes a storage hopper 42 with an inclined bottom wall 43 and a cylindrical bottom portion 44. This cylindrical portion 44 includes a feed auger (not shown) which forces the meat paste contained in the hopper into pipe 46 which is connected to a cylinder valve device 45. Referring to FIG. 6, the valve device 45 includes a valve block 47 having an axial cylindrical bore 48 extending therethrough and connecting to this bore 48 are a side opening 49, a second side opening 50 and a bottom opening 51. The side opening 49 connects the valve block 47 to the meat paste feed pipe 46. The opening 50 is the outlet of the valve and this connects to meat paste delivery pipe 59. To the bottom opening 51 is connected a piston cylinder 57 containing a piston and piston rod 58. This piston rod 58 is connected to an eccentric drive mechanism (eccentric 146 in FIG. 19).

Within the bore 48 of valve block 47 fits a valve cylinder 52 having a curved depression 53 therein. The valve cylinder 52 also includes an arm 54 which is operatively connected to rod 55 of air cylinder 56. In operation the cylinder 52 rotates through reciprocation of the air cylinder between two positions, the first position being that in which openings 49 and 51 are connected through the depression 53 and the second position being that in which openings 50 and 51 are connected through depression 53.

The delivery pipe 59 includes a right angle portion 60 to the end of which is connected a slide valve 61. This slide valve 61 includes a valve block 62 having a hole 63 therein which serves as the dispensing outlet for the meat paste. A pair of guides 64 are positioned on each side of opening 63 and a slide 65 travels up and down in these guides. This slide 65 serves to open and close the opening 63 and is connected to an air cylinder 67 via a cylinder rod 66.

The operation of the valves 45 and 61 are timed via cams and the operational sequence is as follows. The auger in cylinder 44 is continuously operating and thus continuously forcing meat paste along pipe 46. With the cylinder 52 in the first position with openings 49 and 51 connected, the piston 58 in cylinder 57 is moving downwardly and meat paste is forced into this cylinder 57. When the piston 57 has reached the bottom of its stroke the air cylinder 56 is actuated to turn the valve cylinder 52 and thus operatively connecting openings 50 and 51. In this position, the piston in cylinder 57 commences its upward stroke and forces the contents of cylinder 57 along pipe 59. The slide valve 61 is synchronized with valve 45 so that during the time that cylinder 57 is filling, valve 61 is closed and when cylinder 57 is emptying, valve 61 is open. The use of the slide valve on the outlet is particularly advantageous in that it provides a clean break at the beginning and end of each metered amount of meat paste delivered and thus eliminates any spillage in the areas between the cornmeal slices.

The cornmeal slices 32 containing the deposited meat paste 41 continue along in paper 31 to top-sealing station 3.

TOP-SEALING STATION

The top-sealing station is illustrated in FIGS. 7 to 10 and it will be seen that it comprises a pair of electrically heated plates 70 mounted on support arms 83. The heated plates 70 have thermometers 71 attached thereto and current is supplied to the plates from a control unit 72. When the paper is coated with polyethylene, the plates are conveniently heated to a temperature of about 275° F. The surfaces of the heated plates are preferably brass for good heat transfer.

As will be seen from FIGS. 11 and 12, the upper edges of the paper 31 extend beyond the upper edges of the cornmeal slices 32 so that as the paper with the contained cornmeal slices and meat paste filler progress along the carrier, they gradually assume the shape shown in FIG. 11 whereby the upwardly extending edges 82 of the paper eventually come into lateral contact with each other and in this position these upper contacting edges 82 pass between the heated plates 70 where they are heat sealed so that a sealed tubular product emerges from the top-sealing station 3.

The top-sealing station also includes a mechanism for pulling the paper 31 forward along the carrier channel 36. This pulling mechanism includes a pair of wheels 73 mounted on vertical shafts 74 on each side of the carrier channel 36 immediately following the heated plates 70. These wheels 73 contact the outer faces of the upwardly extending sealed marginal edge 82 of the paper and carry the paper forward in the carrier channel. The wheels 73 are driven by the mechanism shown in FIG. 19 and are preferably provided with gripping faces 75 and these can be conveniently in the form of a serrated face on one wheel and a soft resilient face on the other wheel. The important thing is that there is a good gripping contact between the nip of the wheels and the paper. It is important that both wheels 73 are powered in order to provide a uniform pulling of the paper.

Immediately following the pulling wheels 73 is a cutting device 78 for cutting a small notch in the top edge of the sealed paper. The purpose of this notch is to make it easier for the final consumer to tear open the paper package containing the tamale. This cutter mechanism is shown in greater detail in FIG. 10 and it will be seen that it comprises a pair of metal blocks 79 with a narrow passage 80 extending therebetween. The continuous paper tube containing the tamales has only the upper sealed edge 82 thereof passing through the space 80 and at timed intervals a reciprocating cutter plate 81 moves quickly across the gap 80 cutting the notch in the sealed edge 82.

When the paper is being heat sealed between tamales it is important that pressure will be released in the area being gripped during the sealing action and to achieve this a hole 86 (see FIG. 12) is punched in the paper in the region between each tamale. This is done by means of a lance 77 actuated by an air cylinder 76.

After passing through the heat sealing zone, the top-sealed edge 82 of the paper has become quite dry and hard and it was found that this presented difficulties in the final sealing of the paper between the tamales. Thus, it was found that the cutting knife quickly dulled and it was difficult to obtain a good seal. However, it was found that if the top edge of the paper were moistened with some water this difficulty could be avoided. To accomplish this a tank of water 83 is provided with a connecting hose 84 and a dispensing head 85. The dispensing head includes a sponge which is continuously kept wet with water and which brushes against the moving paper thus moistening the top-sealed edge 82.

The continuous paper tube with the moistened top edge then continues along the carrier channel to the end-sealing and cutting station 4.

END-SEALING AND CUTTING STATION

The end-sealing and cutting station, which is illustrated in detail in FIGS. 13 to 18, is a rotary device with a rotatable central housing 90 having a series of 16 equally spaced end-sealing and cutting units 91 radially positioned therearound. Each one of these end-sealing and cutting units 91 includes a heated lower jaw member 92 which is mounted directly on the central housing 90. This lower heated jaw 92 contains electric heating elements therein and these heating elements are connected to controllers 93. When the paper is coated with polyethylene, the lower jaw is conveniently heated to a temperature of around 350° F. The jaw 92 is formed as three parallel V-shaped contact faces including two outer faces 94 and a central face 95 with spaces 96 being provided between the faces 94 and 95. The central face 95 also includes a knife 97 for cutting the paper tube.

An upper jaw member 98 is also provided to engage with lower heated jaw 92. This upper jaw member is formed as a pair of blocks 99 with a space 100 therebetween. The blocks and spaces present V-shaped faces to mate with the corresponding V-shaped faces 94 and 95 and spaces 96 of lower jaw 92. A recess 101 is also provided in central web 100 of upper jaw member 98 to receive the knife 97 in lower jaw 92 when the two jaws 92 and 98 are closed upon each other.

Upper jaw member 98 is mounted on the shaft 102 of an air cylinder 103 which is in turn fixed on a support member 104 mounted on central housing 90. A pair of air lines 105 and 106 are connected to the top and bottom of air cylinder 103 respectively and these air lines are in turn connected to cam controlled pneumatic valves 107.

As can best be seen from FIG. 14, the continuous sealed tube traveling in carrier trough 36 comes into engagement with the radial sealing and cutting unit 91 tangentially at position 108. At this position the jaws 92 and 98 close, pressing the walls of the paper tube together between slices of cornmeal, thereby crimping the paper trapped between the fingers of the jaws. At the same time, the paper tube is cut by means of the fixed knife 97, which mates with recess 101 in the upper jaw. In this clamped position, the portions of the paper tube being held together are heat sealed and travel in a circular path with the rotating, sealing and cutting unit 91 until it reaches the position 109 where a cam opens the jaws and releases the sealed, cut and end-crimped, individual tamales. At this position 109 the wrapped and sealed tamale is deposited on a conveyor 110. Thereafter, the tamales may be packaged, say, into cartons.

To assist in removing the finished tamale from its position resting on lower heated jaw 92, a lifter arm 111 (FIG. 18) is pivotally mounted on upper jaw member 98. With the jaws closed this arm 111 is positioned directly beneath a tamale so that when the upper jaw rises at position 109 the arm 111 also rises picking up the tamale still resting on an adjacent pair of lower jaw members 92 and dumps the tamale on conveyor belt 110. When the upper jaw is lowering at position 108, the arm 111 contacts the paper tube 31 and swings on its pivot to pass by. After passing the paper tube it swings back down into its normal position beneath the paper tube ready to pick up a completed tamale at position 109.

The central housing 90 of the end-sealing and cutting station includes a fixed base 112 about which rotates an annular structure 113 on a vertical shaft 114. At the bottom of shaft 114 is fixed a large gear wheel 127 and this is driven by a pinion 126 mounted on drive shaft 174.

The rotatable annular structure includes a cam wheel 115 which engages followers 116 on the tops of pneumatic valves 107. This cam and follower arrangement serves to open and close the jaws of the end-sealing and cutting units at the appropriate locations. These pneumatic valves 107 are mounted on an annular base portion 117 of the rotatable housing and extending outwardly and upwardly from this annular base portion is a frusto-conical wall portion 118.

Positioned above the pneumatic valve 107 on the annular base 117 are circular electrical power distribution conduits 119. These are connected to the various heat controllers 93 by means of electric wires and current is supplied to the power distribution conduits 119 by means of a central rotating brush arrangement 121.

A compressed air source for the pneumatic valves is supplied via air line 122 and this enters through a rotary air seal 123. From the air seal it is delivered via air line 129 to air distributing manifold 124 from where it is distributed to individual air valves 107 by air line 128.

The entire upper portion of the central housing can be protected by an upper frusto-conical shield 125.

WRAPPED TAMALE

The final wrapped tamale produced by the machine of this invention is illustrated in FIG. 20. It closely resembles a hand-wrapped and tied tamale with a substantially cylindrical body portion 176 and crimped, heat-sealed end portions 177. These end portions have been crimped, heat-sealed and cut from a continuous tube in a single operation in the end cutting and sealing device.

For the purpose of illustration, the heat-sealed longitudinal seam 82 is shown extending out from the main body portion of the tamale but this can be folded compactly against body portion 176. A small slit or notch 178 is provided in the seam 82 and this is for the convenience of the housewife. Thus, after the tamale has been heated in the wrapper and is ready to be eaten, the wrapper must be removed and the notch or slit provides a starting point for tearing the wrapper.

POWER AND CONTROL MECHANISM

Apart from a separate small motor for driving the rotary blade 21, the entire mechanism is driven from a single two horsepower motor. As will be seen from FIG. 19, the motor 145, through a reduction gear 147 and shaft 148 drives a gear box 150. An eccentric 146 is also driven from reduction gear 147 and this drives the piston 58 of cylinder 57 in valve 45. From the gear box 150 there extends in the direction of the cornmeal cutter station a drive shaft 151 connected by universal joints 152. These drive a pair of gears 153 which in turn drive a cam 154. This cam 154 and the corresponding follower 155 actuate an air valve which controls the air cylinder 26 connected to rotary blade 21, controlling its upward and downward movement. Since the forward movement of the cornmeal blocks 5 on the conveyor is directly controlled from the reciprocating arm 25, it will be seen that the cam 154 effectively controls the entire cornmeal cutting station.

Extending in the opposite direction towards the end-cutting and sealing station is a second drive shaft 156 connected by universal joints 157. These drive a pair of gears 158 which drive a gear box 159. From the bottom of this gear box 159 extends a shaft and sprocket wheel 160 which via chain 161 drives a second sprocket wheel 162. This drives a vertically mounted shaft 163 on which are mounted cams 164 and 165. The cam 164 actuates an air valve which controls the lance cylinder 76 while the cam 165 controls an air valve which actuates the notch cutter blade 81.

Extending from the top of gear box 159 is a second shaft 166 with a pair of sprocket wheels 167 and 168. The sprocket wheel 167 is connected via chain 169 to a sprocket wheel 170 which drives the main drive shaft 174 of the end-sealing and cutting station.

The upper sprocket wheel 168 is connected by a chain 171 to a sprocket wheel 172 which drives a shaft 74. This represents the main drive shaft for the paper advancing wheels 73. A pair of gear wheels 175 are provided to operatively connect the pair of paper advancing wheels 73.

Also provided directly on the shaft emerging from gear box 150 is a cam 149 and this cam actuates a follower which in turn actuates an air cylinder controlling the operational sequence of valves 45 and 61 of the meat paste dispensing stations.

Thus, it will be seen that this combined power and control mechanism provides a complete integrated control over the entire system, so ensuring that cornmeal slices of uniform thickness are deposited at regular, predetermined intervals on the paper advancing at constant speed, that a constant predetermined quantity of paste is deposited on each slice and that the end-sealing and cutting device seals and cuts between the cornmeal slices to form regular, individual, paper-wrapped tamales. In this way, it is possible to properly synchronize all of the different components within the very small tolerances permissible in order to produce a satisfactory product at a relatively high production rate.

Although the invention has been described with the reference to certain specific embodiments thereof, it is intended that such matters be purely illustrative for the purposes of clarifying the invention, and that the invention is in no sense limited thereto. Numerous modifications of the present invention will be apparent to those skilled in the art of automatic food processing and packaging machinery. In particular, the machinery or various parts thereof, especially the rotary end-sealing and cutting station can be adapted to the processing of articles other than tamales. Referring to the use of the machine in the processing of tamales, the thickness of each cornmeal slice may be controlled by controlling the period of engagement between the pawl 29 and toothed wheel 28 during each cycle. This can conveniently be accomplished by providing an adjustable arcuate shield over a portion of the surface of the toothed wheel which limits the distance over which the pawl can engage the wheel.

I claim:

1. A method of forming and wrapping foodstuffs comprising:
    (a) moving a continuous strip of heat sealable wrapping sheet material along a carrying and shaping channel;
    (b) sequentially depositing slices of a foodstuff on said strip and forming both the wrapping strip and the foodstuff slices into a substantially U-shape with upstanding edges of the wrapping strip extending beyond the edges of the foodstuff slices;
    (c) depositing a metered amount of a food paste onto each of the travelling slices;
    (d) continuously heat sealing the upwardly extending edges of the U-shaped wrapping strip so as to form a continuous sealed tube with spaced foodstuff articles therein; and (e) heat sealing the continuous tube in the free spaces between the foodstuff articles.

2. A method according to claim 1 wherein the wrapping material is coated paper.

3. A method according to claim 2 wherein the paper is coated with polyethylene.

4. A method according to claim 2 wherein the foodstuff slices are cornmeal slices.

5. A method according to claim 4 wherein the food paste is a tamale meat paste.

6. A method according to claim 5 wherein the tube is heat sealed, cut and crimped in the free space between articles to form individually wrapped tamales with the crimps simulating hand tied tamale wrappers.

References Cited

UNITED STATES PATENTS

| | | | |
|---|---|---|---|
| 3,502,487 | 3/1970 | Byrd | 99—171 R |
| 3,494,303 | 2/1970 | Shiffer | 107—1 R |
| 3,038,811 | 6/1962 | Reading | 99—171 H |
| 2,919,990 | 1/1960 | Podlesak et al. | 99—174 UX |
| 2,764,106 | 9/1956 | Maickel | 107—1 A |
| 2,343,599 | 3/1944 | Walter | 99—87 UX |

FRANK W. LUTTER, Primary Examiner

S. L. WEINSTEIN, Assistant Examiner

U.S. Cl. X.R.

53—28, 29; 99—171 CP, 171 MP, 450.7; 425—301, 305